United States Patent
Schoen

[11] Patent Number: 6,061,379
[45] Date of Patent: May 9, 2000

[54] PULSED X-RAY LASER AMPLIFIER

[76] Inventor: Neil C. Schoen, 9817 Freestate Pl., Gaithersburg, Md. 20886

[21] Appl. No.: 09/232,616

[22] Filed: Jan. 19, 1999

[51] Int. Cl.[7] .................................................. H01S 3/091
[52] U.S. Cl. ................................... 372/76; 372/5; 372/82
[58] Field of Search ................................ 372/5, 76, 82

[56] References Cited

U.S. PATENT DOCUMENTS

| | | | |
|---|---|---|---|
| 5,335,238 | 8/1994 | Bahns | 372/76 |
| 5,345,465 | 9/1994 | Bahns | 372/76 |
| 5,394,411 | 2/1995 | Milchberg et al. | 372/5 |
| 5,637,962 | 6/1997 | Prono et al. | 372/5 |

*Primary Examiner*—Leon Scott, Jr.

[57] ABSTRACT

Two techniques for producing plasma x-ray laser amplifiers, encompassing laser generated high density, micron-sized plasma columns, and microwave driven low density, large plasma volumes which provide the population inversions necessary for x-ray lasing to occur in the plasmas. The laser driven plasma is created by short-pulse, high power laser beams produced by chirped pulse amplification techniques, which are confined to micron-sized cylindrical channels by self-focusing effects and electron density conditioning means. The extremely high powers provide for complete stripping of medium to high Z atoms, which allows for recombination cascading to produce population inversions on the higher energy x-ray transition levels. The very short plasma creation times allow a laser produced "seed" x-ray pulse to be properly timed for injection into the plasma when population inversions reach maximum levels. The microwave driven low density plasma laser produces the population inversion required for laser amplification by use of cyclotron resonance heating of electrons, which affects the fractional ionization and the electron induced de-excitation processes responsible for output power determination. Due to the ability to create large volume plasmas and rapidly change the electron temperature, optimal power levels are achieved. This type of laser may also operate in other, longer wavelength regions of the electromagnetic spectrum.

10 Claims, 9 Drawing Sheets

PULSED X-RAY LASER AMPLIFIER

INTRODUCTION

This application is based in part on material provided in a prior application, Ser. No. 06/859,182 filed on Apr. 28, 1986, which was a continuation of Ser. No. 06/533,768 filed on Sep. 19, 1983. The continuation was abandoned Apr. 5, 1988. Since that time, advances in short-pulse plasma generation, both theoretical and experimental (reference U.S. Pat. No. 4,570,103 and application Ser. No. 09/135,164 filed Aug. 18, 1998, by this inventor) have been made which should allow more efficient and selective pumping to create population inversions for x-ray transitions. Use of these laser-produced plasmas will allow much higher plasma densities (albeit with smaller volumes than examined in the above abandoned applications) to be achieved (with higher gains per centimeter expected), and thus complement the microwave-driven technique explored previously. The calculations developed and submitted in the process of previous applications are still, for the most part valid, and thus are included in this application, along with more recent material covering short-pulse laser plasma generation.

BACKGROUND

Recent advances in the semiconductor processing industry and in x-ray crystallography for biochemical and medical applications have demonstrated the need for more intense, coherent beams of shorter wavelengths or higher brightness, than currently achievable with the newly developed far UV lasers and expensive synchrotron laser sources. Current femtosecond-regime laser-produced plasmas offer the potential of high brightness x-ray sources, but to date suffer from lower than needed photon fluxes due to large bandwidths and relatively large angular divergences in the x-ray beams produced. While there is currently work in progress to overcome these limitations (e.g., the recent patent application referenced above by this inventor), these efforts may be of more value as drivers for dense plasma recombination x-ray lasers than as direct producers of non-coherent x-rays. Other, earlier techniques are briefly described in the following paragraphs.

Free-electron lasers, for example, are candidates for UV and x-ray generation and are presently under development. However, these devices will require very high energy electron beams to reach these wavelengths. In addition to the high cost, technical complexity, and size of these electron beam sources, the gain of FEL devices will be small at these frequencies since the gain scales as $1/\gamma^3$, where $\gamma/2$ is the electron beam energy. It may not be possible to sustain laser oscillations if the gain is comparable to system losses. At present, no high power FEL's exist at sub-visible wavelengths.

Excimer lasers are another technology being developed for output in the UV regime. These devices are at present limited to significant gains in the region above about 2,000 Angstroms. They also require expensive and large electron beam systems for excitation, are limited to pulsed operation, and use highly toxic and corrosive gases.

Plasma lasers have recently been investigated and predictions of potential high energy operation have been made. At present, two techniques have been utilized to generate population inversions; high and low voltage plasma arcs and laser initiated plasmas. Both are limited in the volume of plasma produced and thus the present invention represents a significant improvement in the state-of-the-art of plasma lasers in several important aspects.

SUMMARY OF THE INVENTION

The advent of femtosecond-regime pulsed lasers, enabled by use of chirped pulse amplification (CPA) techniques, has allowed the production of high energy electrons (as described in U.S. Pat. No. 4,570,103), via ponderomotive and plasma acceleration processes, which can be used in a variety of techniques (reference application Ser. No. 09/135, 164) to produce x-rays. One embodiment of this invention makes use of these short-pulse lasers to produce a plasma tube, of the order of several centimeters or less which contains fully ionized plasma(s) of high Z atoms and energetic electrons, which serve as the medium for build-up of population inversions on low level atomic states (e.g., n=3 to 2 transitions) by recombination processes. The plasma tubes, of the order of several microns in diameter, are produced over lengths of several centimeters by extension of the Rayleigh range by a combination of plasma self-focusing and plasma refractive index "shaping" using the laser beam radial profile, or by auxilliary lasers to pre-condition the plasma (reference C. G. Durfee III and H. M. Milchberg, Physical Review Letters, Vol. 71, No. 15, Oct. 11, 1993, pg. 2409). Because the plasma is created on time scales of the order of femtoseconds, and the recombination cascade, even at high plasma densities, is relatively slow, the presence of high energy electrons cannot initially de-populate the inversion on lower levels, because they have not yet been created by radiative or three-body recombination processes. At time scales of the order of nanoseconds or less, the necessary population inversion builds up. However, the remaining electron plasma cannot significantly de-populate these inversions, either because the electron temperature is too high (and therefore preferentially depopulates states at or below the bottom level of the inverted state population (e.g., n=3), or due to subsequent laser and/or electron beam pulses which condition the electron temperature so as to minimize de-population of the inversion.

At the time of maximum population inversion, a "seed" x-ray pulse is injected into the plasma column, and is amplified by the stimulated emission process. This seed x-ray pulse can be generated by similar short-pulse x-ray techiques previously referenced, and be conditioned to have low angular divergence by use of x-ray capillary collimation techniques. This will insure that the main x-ray output pulse will build up from seed photons that are preferentially oriented, and will increase the number of output x-ray photons within milli-radian angular limits.

The microwave-driven plasma laser described herein achieves the required population inversion by direct control of the plasma electron temperature through the use of electron cyclotron resonance heating (ECRH). This allows the control of the fractional ionization and electron temperatures at various times in the laser process which provides a valuable parameter with which to optimize the performance of plasma lasers. In addition, the use of ECRH allows the production of sufficiently dense plasmas in a controlled fashion with large volumes feasible for high power output. The lasing volume is limited only by the ability of the microwaves to penetrate the plasma and the self absorption of the laser radiation by the plasma. These restrictions can be somewhat reduced by making the plasma optically thin in one dimension for both laser and microwave radiation.

In the preferred embodiment of the invention, microwaves enter the plasma, which is located in a magnetic field of value such that electrons in the plasma undergo cyclotron motion under the influence of the electric field of the microwave radiation and thus gain energy, raising the electron temperature. Rapid heating by microwaves causes the plasma to become highly ionized, creating population inversions which result in laser transitions in the UV and x-ray regions of the spectrum. The microwave power is then adjusted to minimize collisional de-excitation of the upper laser levels, along with radiational cooling and expansion cooling, to allow maximum laser output.

The initial plasma generation can be accomplished with the same microwave-frequency as used to control the lasing process. For ion species of solid elements, a separate ECRH system may be necessary to create the desired plasma via a sputtering process. In both cases, large volumes of plasma can be generated, as opposed to the limited diameter plasma column generated in present arc-driven plasma lasers (W. T. Silfvast, O. R. Wood, and J. J. Macklin, Applied Physics Letters, Volume 42, Page 347 (1983)).

The use of ECRH allows very efficient couplings of energy into the plasma, allowing modest power requirements for the microwave source. In addition, the use of microwaves allows control of the electron temperature, a feature lacking in the arc-driven laser process. Although auxilliary lasers can also heat the plasma electrons, very high powers are required to initiate plasma formation. Thus, the plasma lasing region is limited to the focal region for $CO_2$ driven plasma lasers, which must be small for modest size lasers used for plasma formation.

The use of microwaves for plasma formation and control allows a simple cylindrical configuration for the laser resonator in the UV range of frequencies, since the microwaves can be coupled in a variety of ways to the plasma region. The solenoidal magnetic field used for ECRH will also confine the plasma in the radial direction within the cavity field envelope. Output power from this microwave plasma laser is larger than for other devices previously described due to the potential for large volume and the control of the electron temperature, which directly affects the collisional de-excitation process that limits the magnitude of the population inversion. The simplicity of the excitation process and configuration should allow significant technical and economic performance improvements over prior laser art.

DISCRIPTION OF FIGURES

DESCRIPTION OF THE PREFERRED EMBODIMENTS

Figure 1:
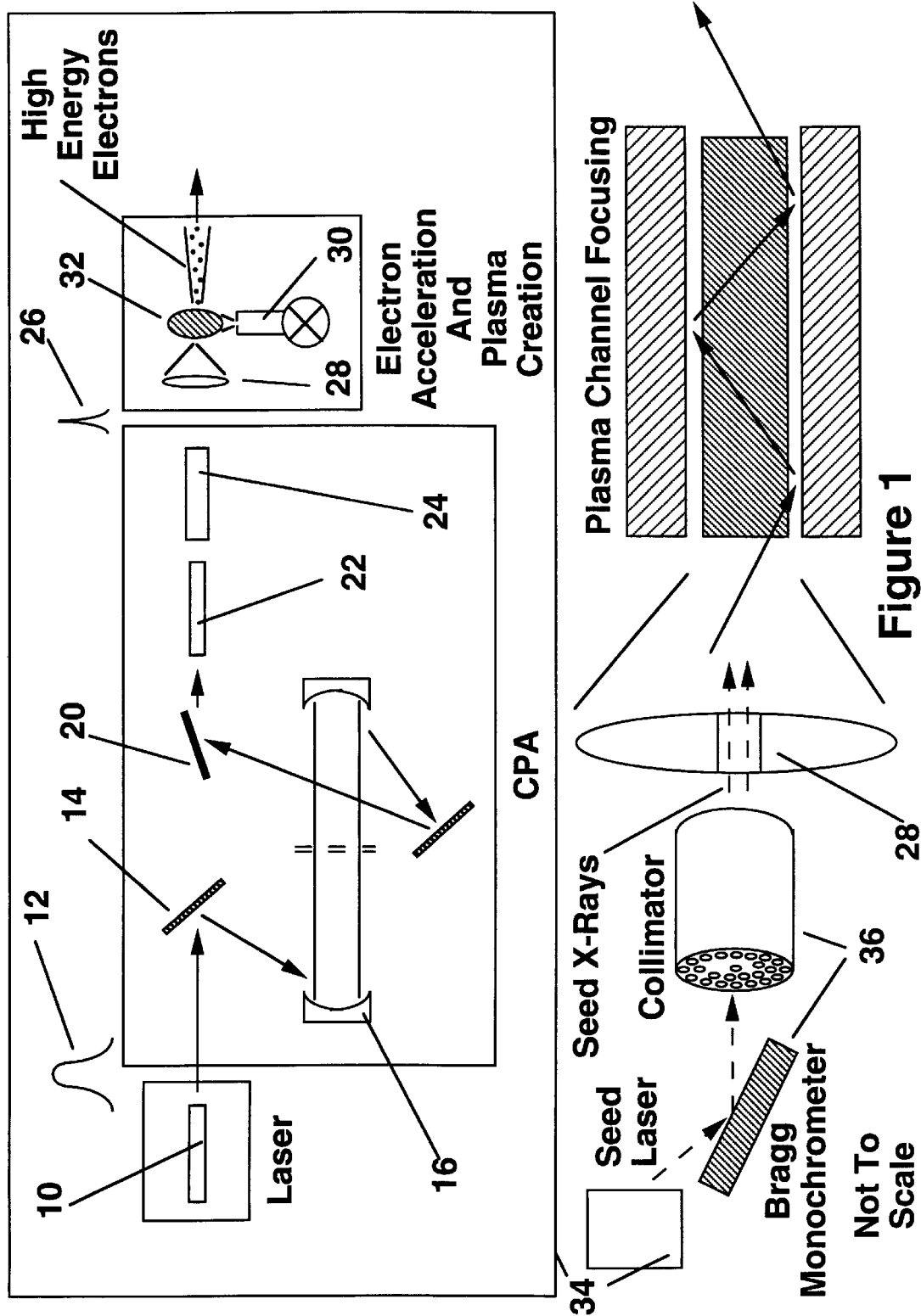
FIG. 1 is a schematic of a pulsed x-ray plasma laser amplifier, including the x-ray "seed" laser and associated equipment.

The following material contains detailed descriptions and the projected performance parameters of the short-pulse laser that produces the plasma needed for x-ray lasing. A schematic is shown in FIG. 1. A source laser 10 provides and initial laser pulse 12 (e. g., a flash lamp-pumped Ti-saphire laser, or a NdYAG glass laser with mode locking and output at 1.06 microns wavelength and several tens of Joules of energy per pulse which can pump a Ti-shaphire after frequency doubling). The output pulse enters the chirped pulse amplifier (CPA) which consists of optical gratings 14 to spatially separate out the pulse Fourier components, a pulse stretching cavity 16, with an embedded mask 18 to modify the phase/amplitude of the now spatially separated pulse Fourier components, and alignment mirror 20 to steer the laser pulses into a laser amplifier 22 and pulse re-compressor 24. The CPA produces a greatly shortened laser pulse 26 of duration several hundred femtoseconds ($10^{-15}$ sec) at a preselected location downstream. Laser optics 28 (optional location) produce a diffraction limited focal spot, typically of the order of a few microns or more in diameter. A gas jet 30 provides maximum density gats at the location of the laser beam focal plane 32 which serves as the plasma source. The laser beam, typically with intensities of $10^{18}$–$10^{21}$ W/cm$^2$ at the focal plane, ionizes the gas creating a plasma source.

The "seed" laser 34 can be a replica of the the system shown in FIG. 1, with x-ray capillary optics 36 to produce a collimated x-ray beam with angular spreads of the order of milli-radians, and a Bragg crystal monochrometer to select the line radiation matching that of the plasma x-ray source desired.

The estimated performance of this laser pumped short-pulse x-ray plasma laser has been estimated based on the following simplified equations describing the physical processes leading to population inversions in the plasma. Although these calculations were made for low density plasmas typical of microwave produced plasmas, similar calculations with higher density plasmas capable of being produced by short-pulse lasers will provide similar results, although the gains will be higher and the timeframes for initiation of lasing will be much shorter.

The following description covers the production of the source plasma by microwave excitation techniques.

The unique and special properties germane to this invention can be best described by considering the various physical processes that take place to produce laser action. The major effects that must occur include ionization, recombination, control of collisional de-excitation, and finally, lasing.

The initial phase of operation of the microwave plasma laser involves the creation of an ionized medium or plasma. To achieve optimum operating efficiency, it is desirable to utilize an energy-efficient ionization process which is capable of producing large volume plasma regions with the appropriate mix of ionization states. Previous plasma laser technology has utilized high and low voltage arcs and high power $CO_2$ lasers to create an ionized region.

Arc discharges are limited in that the temperatures they attain are limited in the duration of time that the higher temperatures can be maintained. For example, for low voltage arcs, the creation of a plasma column quickly lowers the arc impedance, thus reducing the electric fields and limiting the transfer of energy to the plasma. Thus, although high temperatures may be produced, there is a rapid decay to values in the range of 2000°–4000° K. High voltage discharges may produce higher initial temperatures, but decay is rapid, and in both cases, the plasma volume, is limited to the size of the discharge column. Glow discharges can produce larger volumes but have much lower densities to maintain high impedances.

The use of high power $CO_2$ lasers to produce a suitable plasma can result in high ionization states and high temperatures. However, this technique at present is limited to small volumes, since the laser beam must be focused to achieve the high power densities required to produce ionization.

In contrast to prior art, this invention utilizes electron cyclotron resonance to create the necessary ionization. It is well known that an electron in a magnetic field B will oscillate at a frequency $$\omega_c = \frac{eB}{m_c}.$$

If microwave radiation at a frequency $\omega_c$ is introduced, energy is transferred to the electron in resonant fashion, raising its velocity and thus the plasma electron temperature $T_e$. This mechanism is very efficient at coupling energy into the plasma, as opposed to non-resonant breakdown (i.e. lasers) where very high electric fields are necessary so that the electron reaches ionization energy before elastic collisions reduce its energy.

One of the key parameters in determining the plasma laser output power is the electron density, since this quantity affects the collisional de-excitation rate, which reduces the population inversion required for lasing. An estimate of the electron density and temperature can be obtained from a plasma model recently developed (P. J. Moffa, T. Tajima, and J. J. Thomson, Bulletin of the American Physical Society, Volume 25, Page 958, (1980)) for a cylindrical geometry, as given below:

$$N_e = \frac{2 \times 10^{15} \sqrt{M} \, P}{(7/2) R^2 (E^1)^{3/2}} \sqrt{\ln\left(\frac{\sqrt{M} \, LA_o v_o}{2 \times 10^6 \sqrt{E^1}}\right) - \frac{1.27 \times 10^{15} \sqrt{M} \, P}{\sqrt{T_o} \, A_o E^1 R^2}}$$

$$T_e = \frac{E^1}{\ln\left(\frac{\sqrt{M} \, LA_o v_o}{2 \times 10^6 \sqrt{E^1}}\right) - \frac{1.27 \times 10^{15} \sqrt{M} \, P}{\sqrt{T_o} \, A_o E^1 R^2}}$$

where $M$ = neutral mass in proton units = 40

$L$ = length of plasma in centimeters = 50

$A_o$ = neutral density at ends of cylinder = $10^{12}$, $10^{13}$, $10^{14}$ $v_o$ = excitation/ionization rate coefficient = $3 \times 10^{-7}$ cm$^3$/sec $E^l$ = ionization potential in electron volts = 15

$P$ = power of microwave input in kilowatts = 0.1–1000

$R$ = radius of plasma in centimeters = 10

$T_o$ = initial neutral temperature = .05 eV

Figure 2:
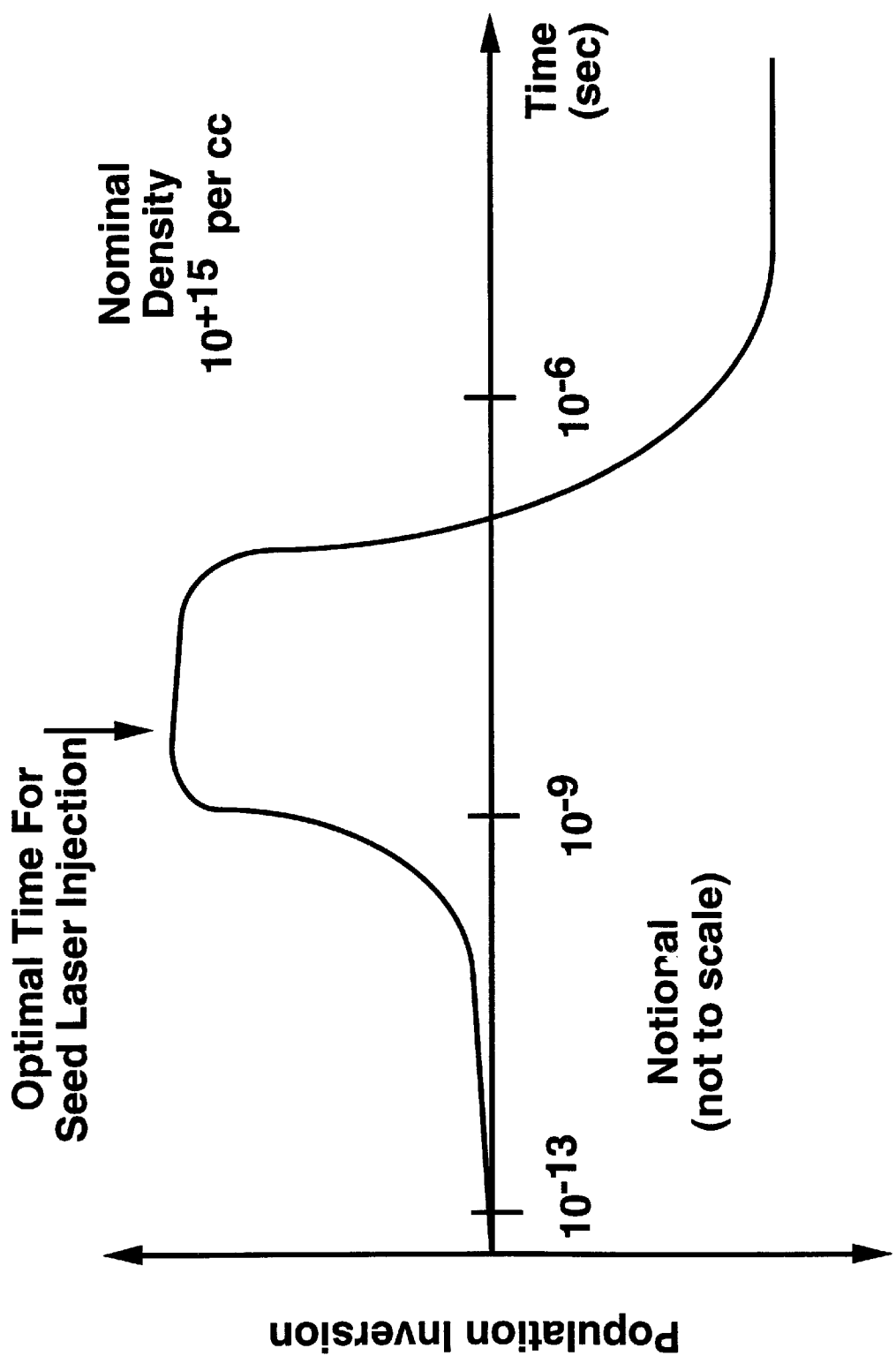
FIG. 2 is a graph of the population inversion as a function of time, as calculated for a low density plasma (of the order of 1E+15 per cubic centimeter); at higher plasma densities, the population inversion is established at an earlier time.

Typical levels of electron temperature are shown in FIG. 1 and electron density in FIG. 2, for various microwave input powers and neutral density values.

It has been shown (O. R. Wood and W. T. Silfvast, Applied Physics Letters, Volume 41, Page 121 (1982)) that the limiting electron density for lasing is approximately $$N_e^{limit} \simeq 0.13 \sqrt{T_e} / \lambda^3$$

where $T_e$ = electron temperature in °K $\lambda$ = laser wavelength in centimeters.

Note that with microwave excitation, electron temperatures can be made higher than levels in low voltage arc lasers, and can be controlled with input power. Thus the limiting electron density can be higher, leading to higher laser output power. This is a significant feature of the microwave plasma laser which is not found in prior art.

Consideration of the penetration of microwave radiation into the plasma is necessary in designing a practical device. The plasma frequency $W_p$, where $$W_p = \sqrt{\frac{N_e e^2}{m \epsilon_o}}$$

and $N_e$ = electron density in #/$^3$ $e$ = electronic charge $m$ = electoron mass $\epsilon_o$ = permitivity of free space determines the approximate cut-off frequency for penetration. At high electron densities the plasma must be kept thin so that the microwaves can reach the entire volume for CW operation. For outputs in the near-visible UV region, plasma densities below $10^{14}$/cm$^3$ will probably be necessary.

An estimate of the output of a microwave plasma laser can be made by assuming that all electrons produced in the ionization process produce a lasing photon. Using a plasma electron density of $10^{14}$/cm$^3$ and assuming a wavelength of about 0.25 microns, one finds $$E_{max}(J/cm^3) = \frac{N_e hc}{\lambda} = 8 \times 10^{-5}.$$

According to FIG. 2, about 60 Kw of microwave power would be required to produce an electron density of $10^{14}$/cm$^3$ for the geometry used in the calculations. This configuration has a volume of about $1.5 \times 10^4$ cm$^3$ and thus total energy output could be a maximum of 1.25 J per pulse. Plasma recombination in the absence of microwave power is typically of the order of $10^{-5}$–$10^{-4}$ seconds so that repetition rates near $10^3$/sec can be considered possible. This leads to output power of about 1 Kw as compared to about 30 Kw for input power assuming a 50% duty cycle, or an efficiency of about 3%.

The potential for reaching higher ionization states is present for higher microwave powers, since the electron temperature can rise rapidly with increasing power as shown in FIG. 1. Higher levels of ionization leads to shorter wavelength laser transitions and the potential for soft x-ray lasing. The gain per unit length can be expressed as $$d \simeq \frac{\lambda^3}{8\pi} A_{ul} \left(\frac{M}{2\pi RT_i}\right)^{1/2} (N_u - N_l)$$

where $A_{ul}$ = spontaneous transition probability $T_i$ = ion temperature $N_u$, $N_l$ = upper and lower level population $k$ = Boltzman constant $\lambda$ = wavelength The population inversion is calculated using ionization rate equations (S. Suckewer and H. Fishman, Journal of Applied Physics, Volume 51, Page 1922 (1980)), and appropriate recombination coefficients. The population inversions are difficult to calculate and experimental verification of the gain values will be necessary to optimize a particular design.

Consider now devices based on the principles of this invention. The physical configuration of a microwave plasma laser will depend to a certain degree on the nature of the lasing ion species. Elements in a gaseous state will have a simpler configuration due to the ease in designing the source. In addition, depending upon the microwave penetration and laser line optical absorption, cylindrical or rectangular geometries can be effective.

Figure 3:
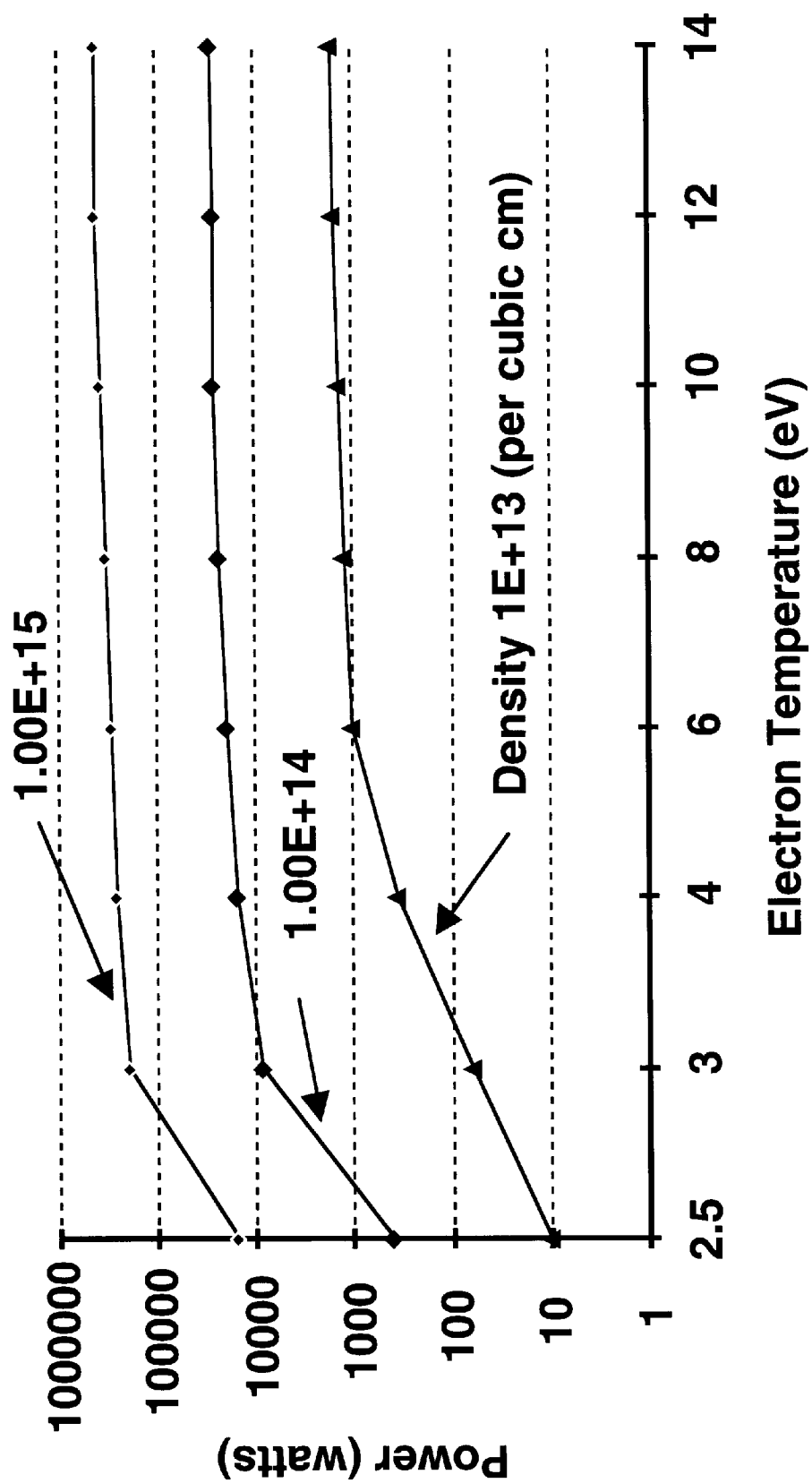
FIG. 3 is a graph showing the plasma electron temperature for various values of microwave power input for three different neutral density levels.

Consider now a design for a cylindrical device, as shown in FIG. 3. The source gas enters from the left 21 and enters the resonator region which is located in a solenoidal magnetic field produced by current coils 23. The microwave radiation enters the cavity region via waveguides 25 located along the length of the resonator region. The microwaves only have to penetrate a distance of one radius to fully excite the plasma, and thus the laser can be longer than the skin depth for the microwave radiation. The resonator mirrors are designed to be totally reflecting 27 and partially transmitting 29 to allow laser radiation to build up and exit the cavity. The source gas can be recycled via exit ports 31 which control the neutral density. Depending upon the gain value of the ion species, Brewster windows may be necessary to reduce reflection losses. These windows will contain the plasma and prevent mirror damage from ion bombardment.

Figure 4:
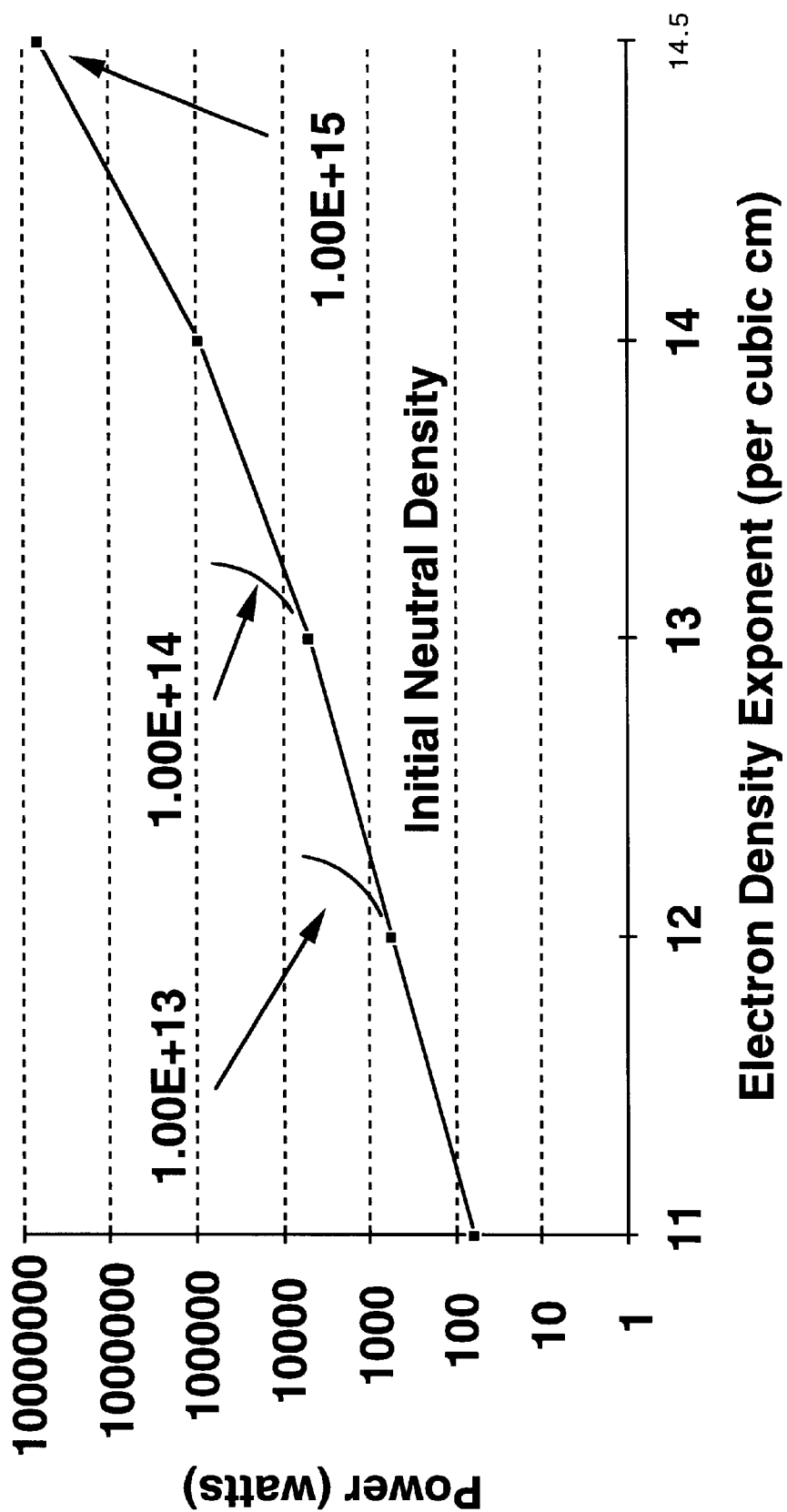
FIG. 4 is a graph showing plasma electron density for various values of microwave input power for three different neutral density levels.

A rectangular configuration is shown in FIG. 4. The rectangular design allows room for microwave waveguide access to the resonator region. Also, permanent magnets may be used to reduce input power requirements. The magnet poles 42 bracket the two resonator mirrors, one of which 44 is partially transmitting while the other is reflective 46. The microwave radiation enters the cavity region via waveguides 48 spaced along the length of the resonator. Gas input 50 and output vents allow control of the ion density.

Figure 5:
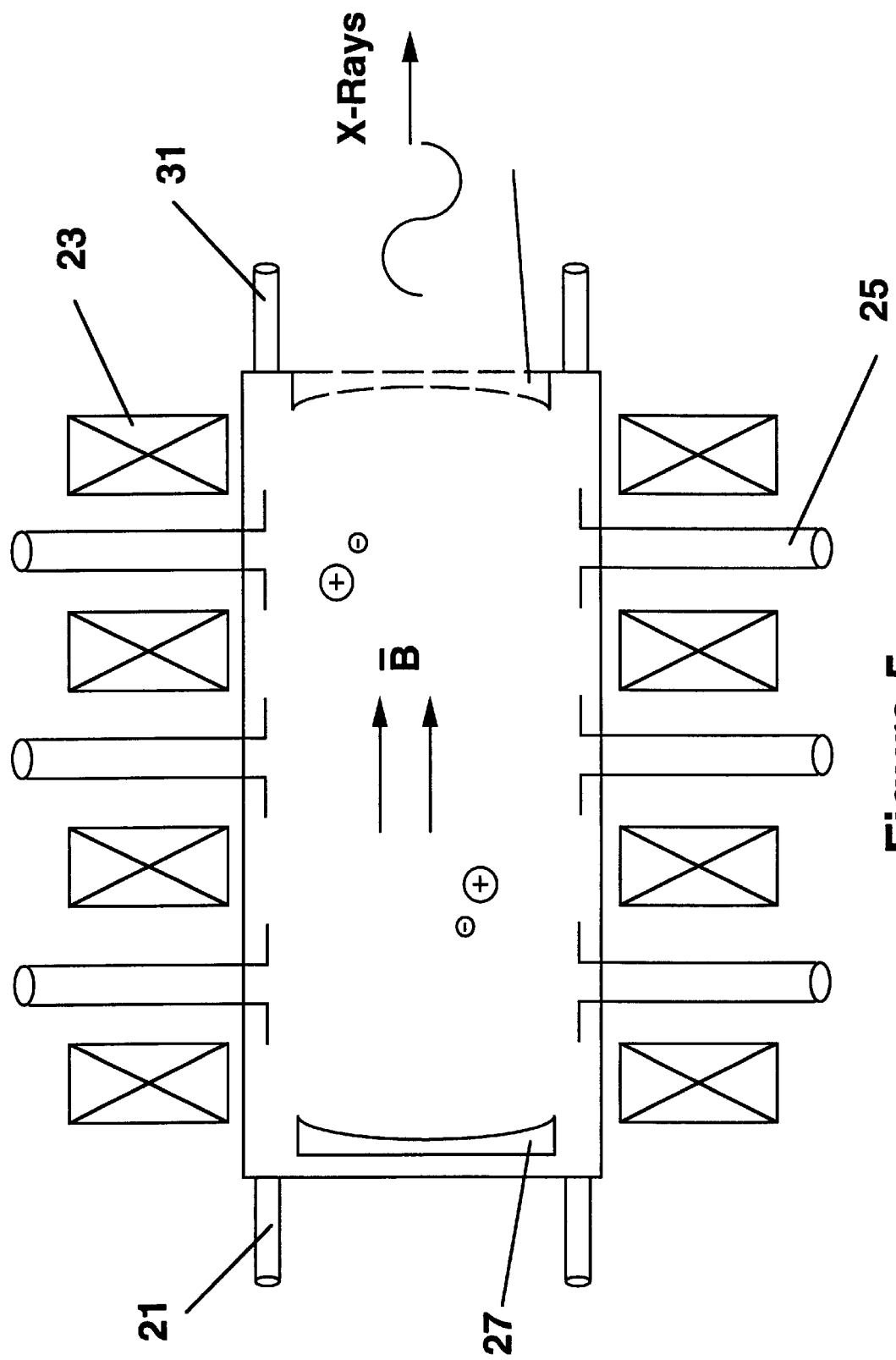
FIG. 5 is a cylindrical microwave plasma laser with a gaseous source constructed in accordance with the present invention.

The two previous designs utilized separate waveguides to feed microwave radiation to the resonator region. An alternate method to feed microwave radiation to the laser cavity utilizes a slotted waveguide to radiate power to the cavity plasma. This technique can be utilized for non-gaseous sources, as shown in FIG. 5. The solid material which will supply the proper ion species forms an electrode 62 as well as a wall of a waveguide structure. The opposite wall is a mesh grid 64 which will allow ions to exit the waveguide. A buffer gas is ionized by the microwave power introduced into the source waveguide. Bombardment of the electrode surface results in sputtered ions leaving the surface where they are ionized by electron collisions from the ECRH mechanism. These ions leave through the mesh and enter the laser cavity region along with electrons, which balance the space charge fields created by departing ions. Magnets 66 provide the necessary magnetic field for the ECRH process. A slotted waveguide 68 provides microwave power for control of the electron temperature and the production of the proper ionization states of the ions. Reflecting 70 and partially transmitting mirrors 72 form the actual laser cavity. Depending upon the ion species, Brewster windows may be utilized to reduce mirror damage and confine the plasma.

Figure 6:
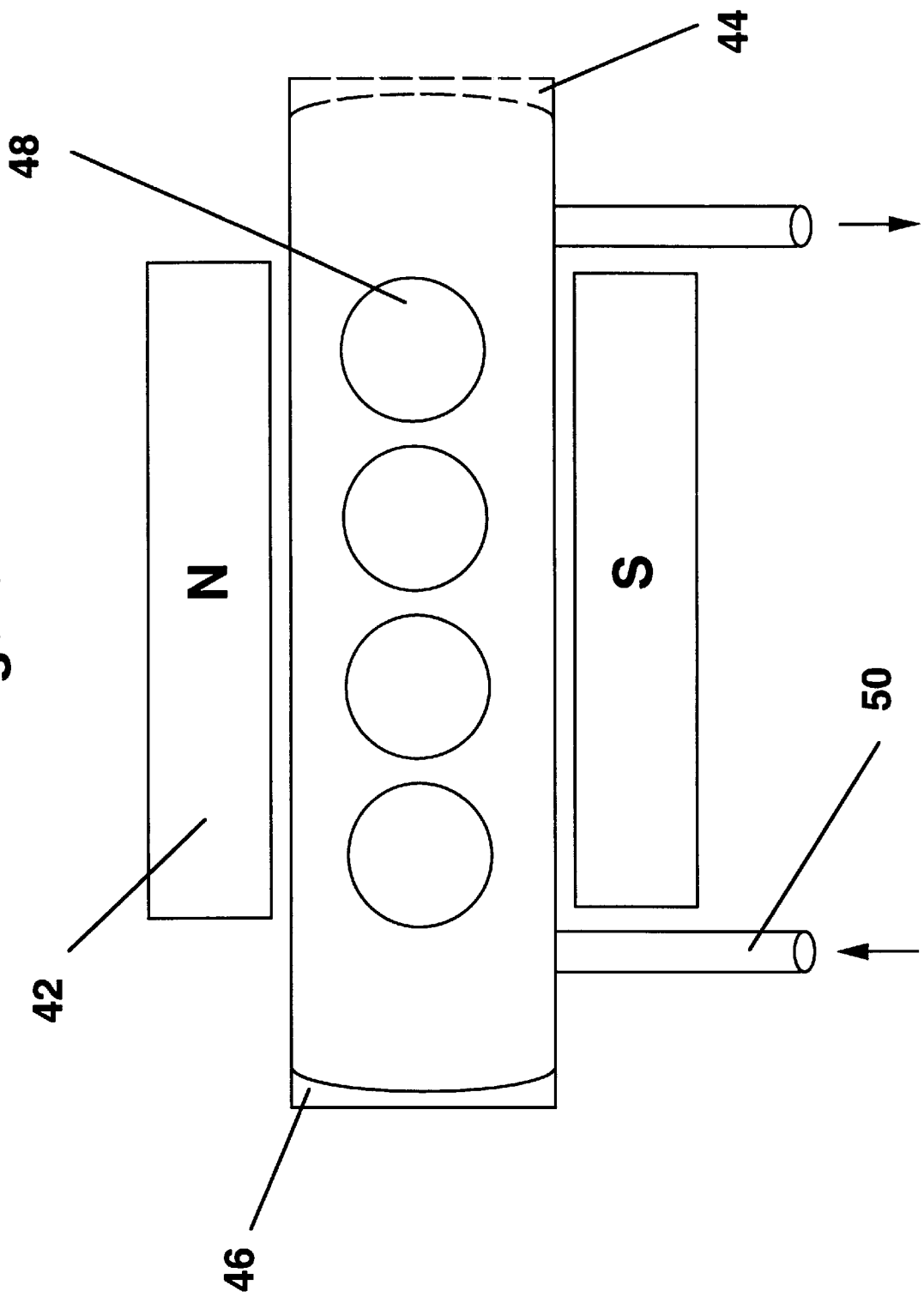
FIG. 6 is a rectangular microwave plasma laser constructed in accordance with the present invention.
Figure 7:
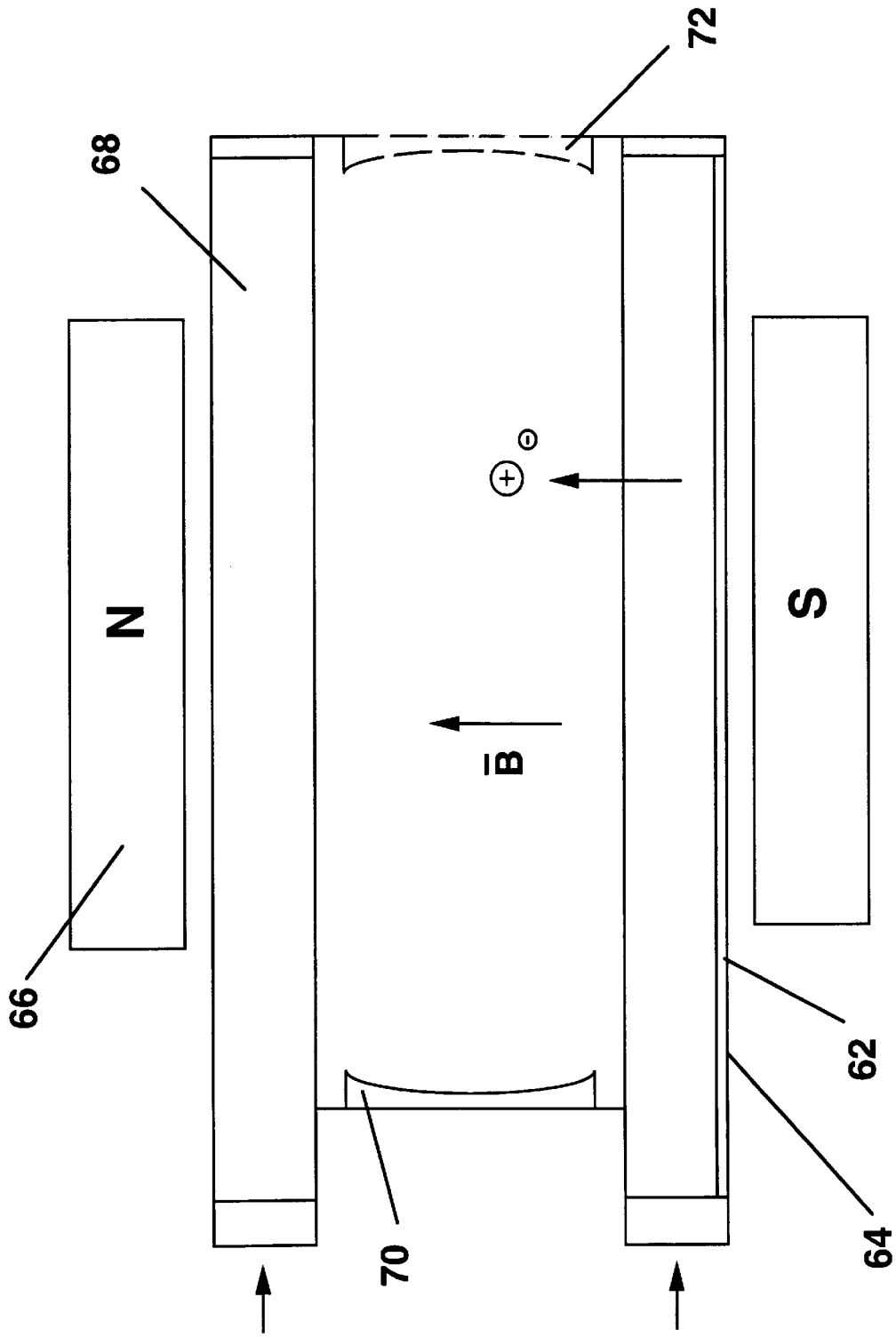
FIG. 7 is a rectangular microwave plasma laser with a sputtered ion source and slotted waveguide microwave feed constructed in accordance with the present invention.
Figure 8:
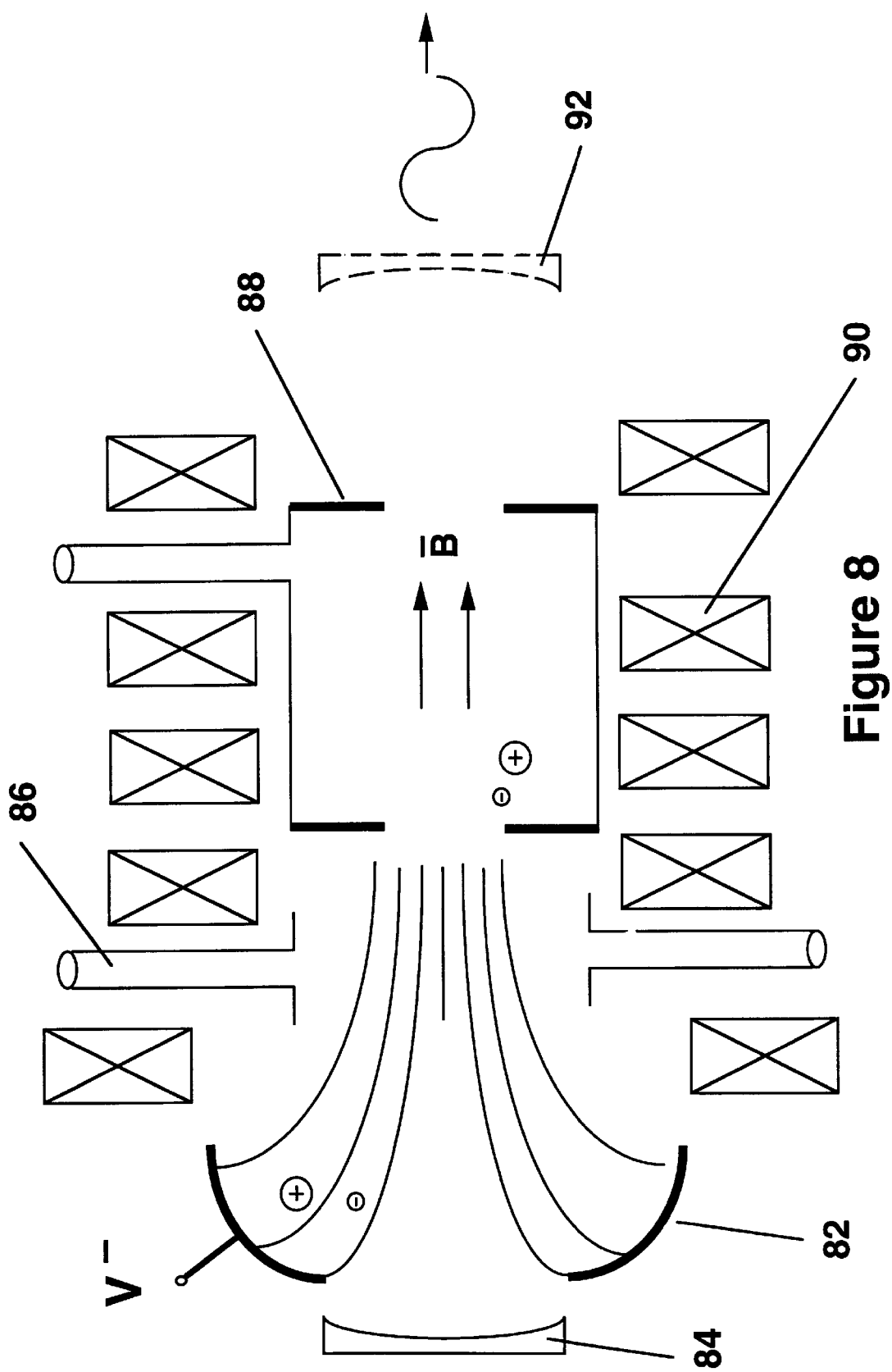
FIG. 8 is a cylindrical microwave plasma laser utilizing a sputtered ion source and a resonant microwave cavity for pumping the ion population levels which is configured in accordance with the present invention.
Figure 9:
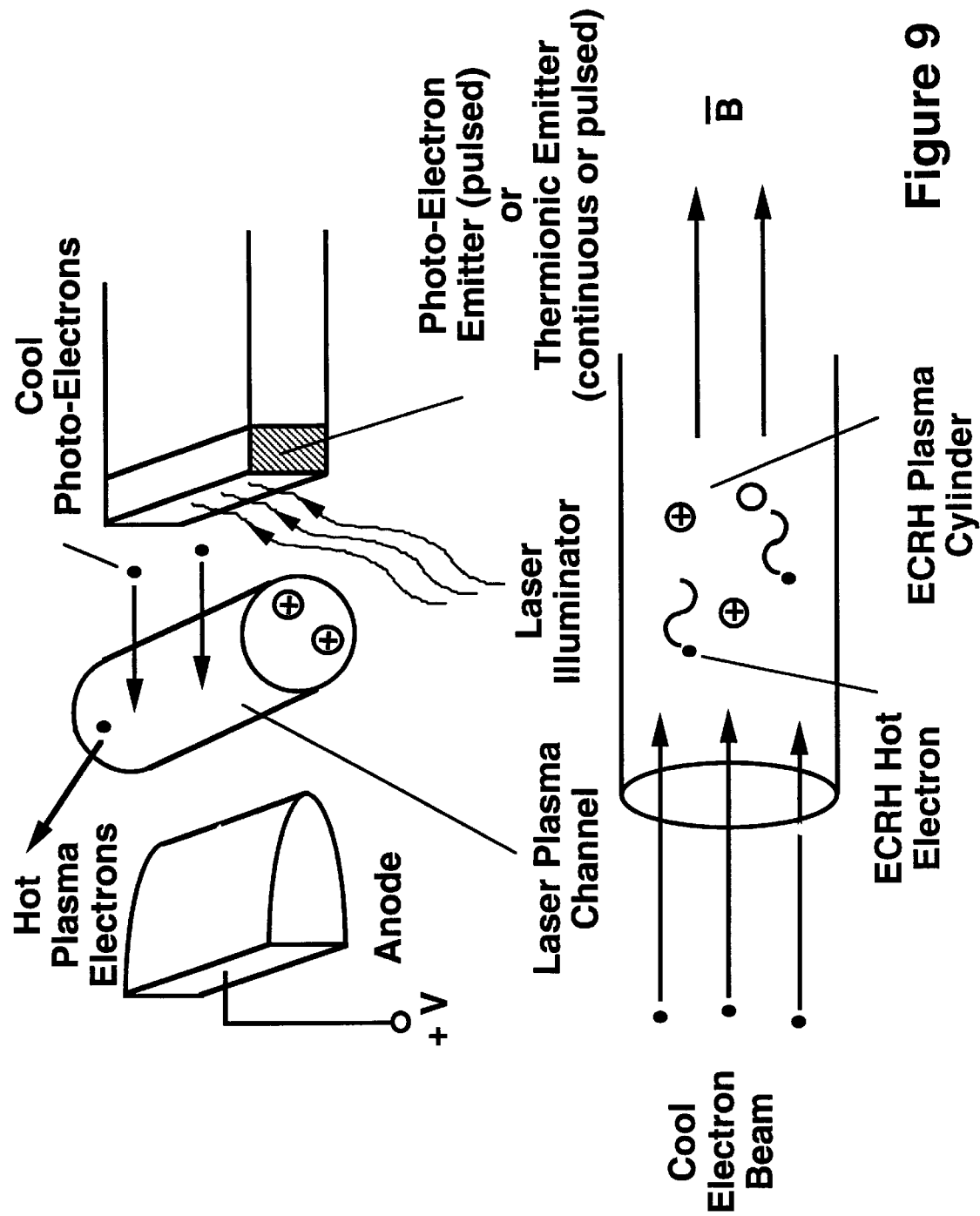
FIG. 9 shows a configuration for injecting cool electrons into a femtoseconds laser produced plasma channel, and a microwave produced plasma cylinder.

Another technique for coupling microwave energy to the plasma utilizes a resonant microwave cavity as shown in FIG. 6. The source electrode 82 has an opening to allow laser light to strike the reflecting mirror 84 without obstructions. Microwave power to operate the ion source is supplied by waveguide feeds 86. The plasma enters the microwave resonant structure 88 where the electron temperature can be adjusted for maximum laser output. The entire structure is immersed in a solenoidal magnetic field produced by current coils 90. Output laser radiation leaves via a partially transmitting mirror 92.

The potential advantages of a microwave cavity are that high peak powers can be attained on a pulsed basis, since energy is built up in the cavity. In addition, the polarization of the microwave source is not as significant as in configurations in which the microwaves are introduced normal to the magnetic field vector.

It should be noted that there are other processes besides ECRH which will allow the production and control of a plasma suitable for laser output. Direct excitation without resonant magnetic fields may be necessary for very high plasma densities or neutral densities. This is due to the electron-ion collision frequency, which when very high prevents the electrons from gaining energy in a resonant fashion. Thus very high electric fields are required to achieve ionization, since the electrons must attain the ionization energy before collisions take place.

In shorter wavelength lasers, where higher ionization states are necessary, it may be possible to control the population inversion on a given laser transition by depopulating an intermediate lower level by controlling the ion energy. Thus use of ion cyclotron resonance heating (ICRH) can be useful in microwave plasma laser design. Each ionization charge state can be influenced by a separate ICRH frequency, and thus it may be possible to selectively overpopulate a given charge state. All of these techniques are to be considered as a part of this invention. In particular, what is claimed is:

What is claimed is:

1. A short-pulse plasma laser amplifier, driven by a laser-produced plasma, comprising;

laser means to provide several Joules of energy in a femtoseconds long pulse of cross sections comparable to diffraction limited focal spot areas, to provide a maximum energy density;

target material means, to serve as a source for the laser plasma, selected from the group consisting of; pulsed-jet high Z gas sources and thin foils;

plasma channeling means to confine the plasma-producing laser pulse to said cross sections over axial lengths of the order of centimeters, which exceeds the Rayleigh region, defined as the axial distance at which the laser beam is twice the diameter of the focal plane spot, including laser self-focusing from plasma gradients and auxilliary laser pulses;

means for producing low energy, cool electrons within close proximity of the laser-produced plasma channel, to allow ion-electron recombination and cascading to inner shell electron states to provide a population inversion, and;

seed laser means to provide initial x-ray photons of an energy matched to the plasma inverted population transition energy and an angular divergence produced by collimation means to provide a short-pulse plasma laser output beam.

2. A device according to claim 1, wherein additional short, high-power laser pulses are injected into and adjacent to the plasma to alter the electron temperature to reduce de-population of inverted levels and enhance the electron-ion recombination rates.

3. A device according to claim 1, wherein a short pulse of electrons, is produced, by a means selected from the group consisting of; laser electron acceleration, photoelectric effect cathodes, and field emission diodes, at appropriate energies, and is injected into the plasma to collisionally pump the plasma lasing transition lower level electrons and alter the plasma electron temperature to sustain and enhance the lasing action.

4. A microwave driven plasma laser amplifier with output radiation in the IR, visible, UV or x-ray spectral region comprising:

electron cyclotron resonance heating (ECRH) microwave radiation means to generate a large volume plasma with a population inversion;

pulsed laser means to alter the plasma electron temperature to levels which reduce collisonal de-excitiation while also producing additional population inversions in ionized and neutral atoms sufficient to produce laser output, and;

seed laser means to provide initial photons of an energy matched to the plasma inverted population transition energy and an angular divergence produced by collimation and focusing means to provide a short-pulse plasma laser output beam.

5. The microwave driven plasma laser according to claim 4 in which ion cyclotron resonance heating (ICRH) is used to control the population density of various ion charge states by inputing several microwave frequencies resonant with the different ion charge states, thus maximizing laser output.

6. A microwave driven plasma laser according to claim 4 which laser operation takes place in continuous fashion (CW) by virtue of continuous microwave excitation and continuous replenishment of excited atoms.

7. The microwave driven plasma laser according to claim 4 in which laser operation is of a pulsed nature and variation of microwave input during the pulse formation allows reduction of collisional de-excitation by control of the electron temperature.

8. A microwave driven plasma laser according to claim 4 in which a tapered magnetic field allows a rapid expansion of the plasma to reduce de-excitation and optimise laser output.

9. The microwave driven plasma laser according to claim 4 wherein microwave input is used to increase the output radiation quantity or spectral or beam quality above that possible without use of microwaves.

10. The microwave driven plasma laser according to claim 4 wherein a pulse of electrons is produced by a means selected from the group consisting of: laser electron acceleration, photoelectric effect cathodes, and field emission diodes, at appropriate energies, and is injected into the plasma to increase laser output energy, by a means selected from the group consisting of: ion-electron recombination, and collisional pumping of the lasing transition lower level electrons to enhance lasing action.

* * * * *

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

Insert attached specification text after
Column 4, Line 49

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

Corrections To Patent #6,061,379
(this material should be inserted after Column 4, Line 49)

The calculations that follow consist of a solution of the differential equations governing the population levels of the proposed helium lasing medium as discussed in the specification. These equations provide numerical values for the population inversion and gain for an n=3->2 transition ($\lambda$ = 1640.7 A°) in $He^+$ driven by recombination from a fully stripped ($He^{2+}$), fully ionized plasma at densities quoted in the specification. In addition, these equations are used to calculate the gain for the same transition in neutral helium, so that the calculated gain can be compared with the measured gain results by Rocca (Appl. Phys. Lett., 47, Dec. 1985 and IEEE, QE-22, No. 4, April 1986). Note that the demonstrated lasing on the n=3->2 line in neutral helium by Rocca coupled with the following calculations should provide the needed confidence that the claims made in this patent application will be observed in experimental devices constructed in accordance with the teachings of this invention.

The actual complete calculations appear in the Appendix section for purposes of continuity and clarity. Highlights will be presented in the following discussion to accent the claims/specifications.

The calculations assume the following conditions, which are compatible with the specification: A high power burst of microwaves are applied to the helium gas within a magnetic field, and the electron cyclotron resonance process produces fully a stripped, fully ionized plasma of large volume (>10e+4 $cm^3$). The plasma density should be of the order of 10e+13 - 10e+14 per $cm^3$ and the required powers are presented in Figures 3 and 4 of the specification. At t=0 the microwave power is shut off, and the plasma is allowed to recombine. Based on the transition probabilities appearing in the Appendix, the recombination proceeds as follows, via radiative and/or three-body processes.

Electrons rapidly recombine into high level n states and then cascade down to the low level n values. As calculated in the Appendix, a characteristic time for recombination is $$t_r = 1/(2N_o \alpha_r) \qquad \text{radiative}$$

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

$$t_3 = 1/(2N_o^2 \alpha_3) \quad \text{three-body}$$

For plasma densities of the order of $N_o = 10e+13 \,/\, cm^3$ and electron temperatures of $T_e = 1$ ev $$t_r \sim 50 \text{ millisec}$$

$$t_3 \sim 150 \text{ millisec.}$$

However, due to the $(T_e)^{-4.5}$ dependence of $\alpha_3$, $t_3$ dominates at lower electron temperatures. At $N_o = 10e+16 \,/\, cm_3$ $$t_r \sim 50 \text{ microsec}$$

$$t_3 \sim 150 \text{ nanosec.}$$

Note that at higher densities and lower electron temperatures (as in the Rocca experiments) the electron density drops very rapidly which will reduce the collisional de-excitation by the time electrons reach low n levels.

Another important time is the spontaneous radiation transition time for all transitions from the upper (n=3) level, or $$t_{A3} = 1/(\sum_{i<3} A_{3i})$$

From the Appendix we find (for He+)

$$t_{A3} = 1/(1.6 \times 10e+9) \sim 0.6 \times 10e-9 \text{ sec.}$$

The solution to the equation for the population of the upper stare $N_3$ can be found easily if we assume that $N_3$ peaks before the ion population drops significantly (i.e., $8N_o \, \alpha_3 \, t_i < 1$) and electron collisional de-excitation is not significant (see Appendix). For both radiative and three-body recombination $t_i$ us about 10e-3 sec or larger for plasmas of $10e+13 - 10e+14/\, cm^3$ and $T_e > 1$ ev. Since cascades from upper to lower levels have

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

transition probabilities from 10e+3 - 10e+5 sec$^{-1}$, the n=3 level should peak before the electron population significantly drops. Under these conditions, the solution for N3 for $0 < t < t_i$ is $$N_3(t) = 4\alpha 3 N_o^3 (1 - e^{-(A \Sigma 3)t}) / (A \Sigma 3)$$

which for $t > 1/(A_{\Sigma 3})$ peaks at $$N_3(max) \sim 4\alpha_3 N_o^3 / (A_{\Sigma 3}).$$

For the conditions we choose for the gain calculations, No = 10e+14 / cm$_3$ and Te = 1 ev, we find $$N\,3\,(max) = 2.2 \times 10e+7 \,/\, cm3.$$

The equation for the lower state population $N_2$ can be found if we assume that the collisional excitation ($X_{12}$) from the ground state (n = 1) is negligible compared with the transition from 2-> 1. For the He+ system $X_{12} < 10e-5$
$A_{21}$, so that $N_1$ cab get large compared with N2 before significant n = 2 excitation can occur. Given this assumption, we find (for $t < t_1$)

$$N_2(t) = N_3 A_{32} (1 - e^{-(A_{21}) t}) / A_{21}$$

This result can be rewritten to reflect the population inversion ratio R as $$R = N_2/N_3 = A_{32} (1-e^{-(A_{21})t})/A_{21}$$

Note that this ratio rises from zero to a maximum value $R_{max} = A_{32} / A_{21}$, which for the He+ system yields
$R_{max} = 0.094$ for the times $t > 1/A_{21}$ which is approximately 0.13 nanoseconds. Thus, after a short time, on the order of a few nanoseconds, the population inversion on the 3->2 transition stabilizes at a value 1/0.094 = 10.6 at times when $N_3$ plateaus at its maximum level. This establishes the conditions necessary for lasing, and is a direct consequence of the almost 10:1 difference in transition probabilities for the 2->1 versus the 3->2 He+ atomic lines.

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

One can now calculate the expected gain for this quasi-stable cascade process using Elton's formula(3) (and in the specification)

$$G = \text{constants} \times f(g_l / g_u) N_u (1 - N_l / N_u)$$

For the parameters chosen above and $T_e \sim 1$ ev $$G = 10e\text{-}7 \ (0.647) \ (0.5) \ N_3(max) \ (1 - R_{max}(2)).$$

Using $N_3(max) = 2.2 \ 10e\text{-}7 \ / \ cm^3$ and $R_{max} = 0.094$ we find $$G \ (cm^{-1}) = 0.6 = 60\%$$

which is sufficiently large to produce significant amplification for metertype devices. The gain will drop rapidly with density due to the $N^3$ dependence of the recombination coefficient $\alpha_{31}$. However, this can be offset with lower electron temperatures via the $(T_e)^{-4.5}$ dependence. Note that collisional de-excitation for this system does not become significant until (see Appendix)

$$N_e = 5.5 \times 10e\text{+}15 \ / \ cm^3$$

which is well above the $10e\text{+}14 \ / \ cm^3$ used in this calculation and therefore a term of the form $-N_3 \ Y_{32}$ in equation 2 (for $N_3$) can be ignored compared to $-N_3 \ A_{\Sigma 3}$.

Although this series of calculations does not explicitly model the complex cascade transitions, the limiting factor in the magnitude of the upper state population $N_3$ will be the time to cascade to $n = 3$ compared with the recombination rate. A quick scan of the transition tables in reference 1 in the Appendix indicates cascade times of the order of $10e\text{-}03$ sec (assuming 3 - 10 jumps to $n = 3$). If the recombination rate $\alpha$ for a given density is slower, $N_3$ (max) is determined by $\alpha$ (as is the case calculated); if the recombination rate is faster than the cascade rate, then any benefits of higher $\alpha$ (from density or temperature) will be lost, since the cascade rate will determine $N_3$ (max). Thus, the calculations made in this case appear to be valid and indicate that lasing should occur as

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

claimed in this specification. However, the following calculations as applied to the experiment of Rocca (which demonstrated a 3->2 lasing in $He^o$) should provide significant confidence (by "anchoring" these equations to actual measurements) that ECRH-pumped "low" density lasers will be feasible.

The conditions in the Rocca experiment are sufficiently different than the previous calculation that changes in the equations result. At parameters obtained from this reference (i.e., $N_o$ = 10e+16 / $cm^3$ and Te = 0.1 ev), the three-body recombination rate is sufficiently high so as to rapidly deplete the free electron population relative to the cascade rate. For example, the electron population will fall from 10e+16 / $cm_3$ to 10e+13 / $cm^3$ in a characteristic time $$t(10e+16 : 10e+13) = 10^3 / 8N_o \alpha_3 = 10^3 / (g\,(10e+16)^2 (2.77 \times 10e-22))$$

which yields a time t = 4.5 nanoseconds. By comparison, the electron cascade times will be of the order of
1Oe-3 - 1Oe-5 sec. If we define a cascade transition probability Ac (which is an average rate for many complex paths to n = 3), then the equation 2 for $N_3$ will be $$d\,N_3 / dt - N_3\,A_{\Sigma 3} + N_c A_c$$

where $N_c$ is the state which receives the electrons from recombination. $N_c$ will be approximately $N_o$ after about 50 nanoseconds due to rapid recombination. Therefore, $N_3(max)$ will be (for $dN_3/dt = 0$)

$$N_3\,(max) = (A_c / A_{\Sigma 3})\,N_o$$

The following transition data (from reference 1 in the Appendix) apply to $He^o$:

| | $A_{ul}$ (sec-1) | $f_{ul}$ |
|---|---|---|
| n = 3->2 | 0.638 x 10e+8 | 0.711 |
| n = 3-> 1 | 5.66 x 10e+8 | 0.0 734 |
| n = 2-> 1 | 17.99 x 10e+8 | 0.2762 |

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

and $g_3 / g_2 \sim 2$ with $\lambda = 6678.15$ A°.

Using the above data, assuming $A_c = 10e+3$ $sec^{-1}$ we find $N_3(max) = 10e+3 \times 10e+16 / 6.3 \times 10e+8 = 1.6 \times 10e+10 / cm^3$ The population inversion ratio is $N_2 / N_3 = (0.638 \times 10e+8) / (17.99 \times 10e+8) = 0.035$ and the ion velocity factor is Therefore, the calculated maximum gain is $G = 5.22 \times 10e-9$ $(3 \times 10e+10)$ $(6.678 \times 10e-5)$ $(0.711)$ $(0.5)$
    $(6.3 \times 10e-6)$ $(1.6 \times 10e+10)$ $(1 - (0.035)(2))$.

or $G = 3.5 \times 10e+3$ $cm^{-1}$ (no collisional de-excitation). This high gain does not in fact exist due to collisional de-excitation. The electron density limit for this process is (see Appendix)

Thus, no lasing takes place until $N_e$ drops to the order of $10e+13 / cm^3$ (which takes about 50 nanoseconds). At this point $N_3$ (max) is (assuming cascade levels are de-populated)

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

$$N_3(max) = 10e+3 \, (10e+13) / (6.3 \times 10e+8) = 1.6 \times 10e+7 \,/\, cm^3$$

and the expected gain G is thus $$G = 3.5 \, cm\text{-}1 = 350\% \, cm^{-1}.$$

Given the approximations made in this calculation and the fact that the lower level could be populated via beam electron collisions, the estimated experimental value of approximately 1 % $cm^{-1}$ is not unexpected.

Calculation Formulas Appendix

References:
1. W. L. Wiese, M. W. Smith, and B. M. Glennon, NSRDS-NBS-4, "Atomic Transition Probabilities", May 1966 (National Bureau of Standards).
2. David L. Book, NRL 0084-4040, "NRL Plasma Formulary", (1987 Revised), pp. 52-57.
3. R. C. Elton, "Progress and Trends in X-Ray Laser Research", <u>Optical Engineering.</u>, March/April 1982, Vol. 21, No. 2, pg. 307.

The following calculation assumes a fully ionized helium plasma ($He^{2+}$) at time t=0, with recombination by cascade producing a population inversion, as described by Elton(3). To substantiate the claims, the n = 3->2 transition was chosen, resulting in a lasing frequency $\lambda$ = 6562.80/ ($Z^2$=4 ) = 1640.7 A° which is close to the UV Lyman-like range seen in standard hydrogen discharges and mentioned in the specification.

The following spectroscopic data (from reference 1) will be used in the calculations:

$$Z = 2 \quad N_e = 2N_o \quad g_3/g_2 = 2$$

|  | $A_{ul}$ (sec$^{-1}$) | $f_{ul}$ |
|---|---|---|
| n = 3->2 | 7.06 x 10e+8 | 0.6407 |

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

and $g_3 / g_2 \sim 2$ with $\lambda = 6678.15$ A°.

Using the above data, assuming $A_c = 10e+3$ sec$^{-1}$ we find $N_3(max) = 10e+3 \times 10e+16 / 6.3 \times 10e+8 = 1.6 \times 10e+10 / cm^3$ The population inversion ratio is $N_2 / N_3 = (0.638 \times 10e+8) / (17.99 \times 10e+8) = 0.035$ and the ion velocity factor is $$\sqrt{\frac{M}{2\pi k T_i}} = 1.0 \times 10e\text{-}6 \ (2) \ / \ (0.316) = 6.3 \times 10e\text{-}6$$

Therefore, the calculated maximum gain is $G = 5.22 \times 10e\text{-}9 \ (3 \times 10e+10) \ (6.678 \times 10e\text{-}5) \ (0.711) \ (0.5)$
$\quad (6.3 \times 10e\text{-}6) \ (1.6 \times 10e+10) \ (1 - (0.035) \ (2))$.

or $G = 3.5 \times 10e+3$ cm$^{-1}$ (no collisional de-excitation). This high gain does not in fact exist due to collisional de-excitation. The electron density limit for this process is (see Appendix)

$$N_e = 1.3 \times 10e+13 \ \sqrt{T_e} (\Delta E_{32})^3$$

$$= 1.3 \times 10e+13 \ \sqrt{0.1} \ (1.85)^3$$

$$= 2.6 \times 10e+13 \ / \ cm^3.$$

Thus, no lasing takes place until $N_e$ drops to the order of $10e+13 / cm^3$ (which takes about 50 nanoseconds). At this point $N_3$ (max) is (assuming cascade levels are de-populated)

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

| | | |
|---|---|---|
| n = 2-> 1 | 7.52 x 10e+9 | 0.4162 |
| n = 3->1 | 8.91 x 10e+8 | 7.91 x 10e-2 |
| n = 40->2 | 1.08 x 10e+3 | 5.405 x 10e-5 |
| n = 20-> 19 | 3.31 x 10e+4 | 3.909 |

The transition probabilities ($A_{ul}$) shown above indicate the dominant process is electron recombination into high n-states, followed by cascades by $\Delta n$ to low lying levels, where a significant population inversion develops. The four equations governing this simplified process are as follows:

1. $\dfrac{dN_o}{dt} = 2\alpha_r N_o^2$     radiative     (fully stripped @ t=0)

$\phantom{\dfrac{dN_o}{dt}} = 4\alpha_3 N_o^3$     three-body

2. $\dfrac{dN_3}{dt} = -N_3 A_{\Sigma 3} + N_o \alpha N_e$

3. $\dfrac{dN_2}{dt} = N_3 A_{32} - N_2 A_{21} + N_1 X_{12}$

4. $\dfrac{dN_1}{dt} = N_2 A_{21} - N_1 X_{12}$     (A = transition rate

X = electron excitation rate).

Equation 1 can be integrated directly and results in a decay of fully stripped ions of the form $$N_i(t) = N_o / (2 N_o \alpha_r t + 1) \qquad N_o = N_i(0)$$

where $\alpha_r$ is the recombination rate. For radiative recombination, $\alpha_r$ can be calculated [2] as $\alpha_r(Z) = 2.7 \times 10^{-13} Z^2 T_e^{-1/2}$ cm$_3$ / sec

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

For three-body electron-ion recombination, equation 1 becomes $$(N_i(t))^2 = N_o / (8N_o^2 \alpha_3 t + 1)$$

with $\alpha_3$ calculated as
$\alpha_3 = 8.75 \times 10^{-27} T_e^{-4.5}$ cm$^6$ / sec.

The following equations (2 - 3) will be solved using the radiation recombination process. The inclusion of three-body recombination will be shown to raise the upper state population and thus laser output power.
Equation 2 now becomes $$\frac{dN_3}{dt} = -N_3 A_{\Sigma 3} + 2\alpha_r N_o^2 / (2N_o \alpha_r t + 1)^2$$

The upper state population $N_3$ is at a maximum when $dN_3/dt = 0$ so that $$N_3(\max) = \frac{2\alpha_r N_o^2}{A_{\Sigma 3}(2N_o \alpha_r t(\max) + 1)^2}$$

where $A_{\Sigma 3} = \sum_{m<n=3} A_{nm}$. If one assumes that $N_3$ peaks while the stripped ion population is high (i.e., $N_o \alpha_r t(\max) < 1$), then the peak upper state population can be written as $$N_3(\max) = \frac{2\alpha_r N_o^2}{A_{\Sigma 3}}$$

For $0 < t < t(\max)$

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

$$N_3(t) = \frac{2\alpha_r N_o^2}{A_{\Sigma 3}} (1 - e^{-(A_{\Sigma 3})t})$$

We can now solve equation 3 (assuming $N_1 X_{12}$ is negligible for t=t(max) which is likely since $X_{12} \ll $ 1Oe-5 $A_{21}$) for the regime where $N_3$ is a maximum (i.e., slowly varying C t=t(max)). Substituting $N_3$(max) for $N_3$ one obtains the equation for the lower state population $N_2$ as $$N_2 = N_3 \frac{A_{32}}{A_{21}} (1 - e^{-(A_{21})t}) \qquad \text{t=t(max)}$$

Note that laser power will depend on the population inversion $R = N_3 / N_2$ and the value of $N_3$. Note also that R can reach a maximum of R(max) = $A_{21} / A_{32}$.
Given the upper and lower population densities, one can now calculate the gain coefficient using the formula [3]

$$G = \pi^2 r_o c \lambda f(g_l/g_u) \sqrt{\frac{M}{2\pi k T_i}} N_u (1 - \frac{N_l g_u}{N_u g_l})$$

Where
$\pi 2 r_o$ = 5.22 x 10e-8 cm
c = 3 x 10e+10 cm/sec
$\lambda$ = 1.6407 x 10e-5 cm
f3->2 = 0.6407
g2/g3 = 0.5

$$\sqrt{\frac{M}{2\pi k T_i}} = 10^{-6} \times (T_i)_{ev}^{-1/2} \mu^{1/2} \text{ sec/cm} \qquad (\mu = 4 \text{ for He})$$

For $T_i$ = Te = 100 ev and N = 10e+13 / cm$^3$ one finds

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

$$\alpha_r = 2.7 \times 10^{-13} \times \frac{4}{\sqrt{100}} = 1.1 \times 10^{-13} \text{ cm}^3 / \text{sec}$$

and $$N_u = N_3(\text{max}) = 2(1.1 \times 10^{-13}) \frac{(10^{13})^2}{1.6 \times 10^9} = 1.35 \times 10\text{e}+4 / \text{cm}^3$$

and therefore  $G = (5.22 \times 10\text{e-}8)(3 \times 10\text{e+}10)(1.6407 \times 10\text{e-}5)$
$\times (0.6407)(0.5)(2 \times \text{loe-}5)(N_u)$ or  $G = 1.8 \times 10\text{e-}3 = 0.18\% \text{ cm}^{-1}$.

This gain is low due to the slow recombination via the radiative process. If we now calculate the three-body recombination coefficient, we find $$\alpha_3 = 8.75 \times 10\text{e-}27 \, (100)^{-4.5} = 8.75 \times 10\text{e-}36 \text{ cm}^6 / \text{sec}$$

This leads to $$N_3(\text{max}) = 4(8.75 \times 10\text{e-}36)(10\text{e+}13)^3 / (1.6 \times 10\text{e+}9) = 2.25 \times 10\text{e-}5 / \text{cm}^3$$

which is significantly lower than the radiative recombination process. However, if one considers a more dense plasma, with a correspondingly lower $T_e$, then the three-body process can approach and exceed the radiative recombination and lead to more substantial gains. For example, for $N_o = 10\text{e+}14 / \text{cm}^3$ and $T_e = 1$ ev, one finds $$N_3(\text{max}) = 2.2 \times 10\text{e+}7 / \text{cm}^3$$

from the three-body recombination and $$N_3(\text{max}) = 1.35 \times 10\text{e+}7 / \text{cm}^3$$

from radiative recombination, yielding

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

$N_3$(max) (total) = 3.5 x 10e+7 /cm$_3$

The gain coefficient now becomes

G = 0.73 = 73 % cm$^{-1}$ which is relatively high to allow significant laser output. Small signal gains similar to this level were measured in the references (Jorge J. Rocca, et. al.) in which lasing was demonstrated for cadmium and helium. It should also be noted that the ECRH process clained in this invention should produce a plasma with a hot electron component sufficient to ionize fully, along with cooler electrons to provide the appropriate recombination rate. Figures 3 and 4 of the specification indicate that 10e+14 /cm$^3$ at 1 ev should be achievable, resulting in the gain levels calculated, and therefore lasing should occur.

The final calculation below will show that electron collisional deexcitation will not be significant at the above densities and temperatures, a condition that could present problems for high density approaches such as laser-produced plasmas. The density limit for electron de-excitation can be found [2] by setting the electron collisional de-excitation rate $Y_{ul}$ equal to the rate for spontaneous decay $A_{ul}$ for the lasing transition. This yields the result of Wood and Silfvast reference quoted in this specification $$N_e(\max) = 1.3 \times 10^{13} \sqrt{T_e} (\Delta E_{ul})^3$$

which for the previous parameters of Te = 1 ev and $\Delta_{ul}$ = 7.5 ev gives $N_e$(max) = 5.48 x 10e+15 /cm$^3$.

In conclusion, the previous calculations show that significant population inversions and gains should develop in this helium plasma (as it cools and recombines) on the time scales of the order of $\tau_{lase} = 1 / A_{\Sigma 3}$.

UNITED STATES PATENT AND TRADEMARK OFFICE
CERTIFICATE OF CORRECTION

PATENT NO. : 6,061,379
DATED : May 9, 2000
INVENTOR(S) : Neil C. Schoen

It is certified that error appears in the above-identified patent and that said Letters Patent is hereby corrected as shown below:

It is likely that other elements will also lase on recombination after ECRH pumping, as claimed.

Signed and Sealed this

Fifth Day of February, 2002

Attest:

Attesting Officer

JAMES E. ROGAN
*Director of the United States Patent and Trademark Office*